United States Patent
Lefaure

(10) Patent No.: US 8,258,931 B2
(45) Date of Patent: Sep. 4, 2012

(54) METHOD OF POSITIONING SENSORS FOR TWINNED WHEELS OF A VEHICLE

(75) Inventor: Philippe Lefaure, Montbrun Lauragais (FR)

(73) Assignee: LDL Technology, Ramonville Saint Agne (FR)

( * ) Notice: Subject to any disclaimer, the term of this patent is extended or adjusted under 35 U.S.C. 154(b) by 372 days.

(21) Appl. No.: 12/599,269

(22) PCT Filed: May 9, 2008

(86) PCT No.: PCT/FR2008/050816
§ 371 (c)(1),
(2), (4) Date: Jan. 8, 2010

(87) PCT Pub. No.: WO2008/149009
PCT Pub. Date: Dec. 11, 2008

(65) Prior Publication Data
US 2010/0134262 A1    Jun. 3, 2010

(30) Foreign Application Priority Data

May 9, 2007    (FR) ...................................... 07 54933

(51) Int. Cl.
*B60Q 1/00*    (2006.01)
(52) U.S. Cl. ..................... 340/425.5; 340/447; 340/442; 340/445; 340/539.21; 73/146.5
(58) Field of Classification Search ............... 340/425.5, 340/442–448, 438, 870.28, 539.21; 73/146.2, 73/146.3, 146.4, 146.8, 146.5
See application file for complete search history.

(56) References Cited

U.S. PATENT DOCUMENTS

| | | |
|---|---|---|
| 6,257,289 B1 | 7/2001 | Tomita et al. |
| 6,369,703 B1 * | 4/2002 | Lill ............................... 340/447 |
| 6,571,617 B2 * | 6/2003 | Van Niekerk et al. .......... 73/146 |

(Continued)

FOREIGN PATENT DOCUMENTS

EP    1 236 588 A    9/2002

(Continued)

OTHER PUBLICATIONS

International Search Report, Dec. 9, 2008, from International Phase of the instant application.

*Primary Examiner* — Hoi Lau
(74) *Attorney, Agent, or Firm* — Jackson Patent Law Office

(57) ABSTRACT

The invention relates to a method of positioning sensors on wheels (200 and 300) installed coaxial to the same end of one and the same axle of a vehicle (C) comprising a receiving module (100) associated with the body of the vehicle, noteworthy in that it consists in positioning the sensors (210 and 310) at an angular interval greater than or equal to ninety (90) degrees of a wheel (200) relative to the other (300) so that, when operating in displacement mode, the distance between the receiving module and the sensor varies according to the wheel rotation, and in using a link of low frequency (LF) type so that the creation of a distance between the points of emission makes it possible to vary the power of the signals received, thus rendering them distinct. The invention also relates to a device making it possible to implement the method described hereinabove. Applications: measurement and transmission of data associated with the wheels of a vehicle.

7 Claims, 2 Drawing Sheets

U.S. PATENT DOCUMENTS

| | | | |
|---|---|---|---|
| 6,668,636 B2* | 12/2003 | Nantz et al. | 73/146.4 |
| 6,691,567 B2* | 2/2004 | Walker et al. | 73/146 |
| 6,693,522 B2* | 2/2004 | Tang et al. | 340/445 |
| 7,482,921 B2* | 1/2009 | Froitzheim et al. | 340/539.21 |
| 7,778,741 B2* | 8/2010 | Rao et al. | 701/1 |
| 7,817,023 B2* | 10/2010 | Shimura | 340/442 |
| 8,149,100 B2* | 4/2012 | Gila et al. | 340/447 |
| 2002/0130771 A1 | 9/2002 | Osborne | |
| 2003/0197603 A1* | 10/2003 | Stewart et al. | 340/442 |
| 2004/0189457 A1* | 9/2004 | Watabe | 340/445 |
| 2005/0093687 A1 | 5/2005 | Katou | |
| 2006/0012475 A1* | 1/2006 | Froitzheim et al. | 340/539.23 |
| 2006/0152353 A1* | 7/2006 | Fischer et al. | 340/442 |
| 2006/0279416 A1* | 12/2006 | Watabe | 340/447 |
| 2008/0129478 A1* | 6/2008 | Fink et al. | 340/447 |
| 2008/0129479 A1* | 6/2008 | Braun et al. | 340/447 |
| 2008/0191855 A1* | 8/2008 | Fink et al. | 340/447 |
| 2008/0255719 A1* | 10/2008 | Kitano | 701/29 |
| 2009/0085734 A1* | 4/2009 | Gila et al. | 340/447 |
| 2009/0237228 A1* | 9/2009 | Watabe | 340/447 |
| 2010/0085212 A1* | 4/2010 | Gerardiere | 340/870.28 |
| 2010/0134262 A1* | 6/2010 | Lefaure | 340/425.5 |
| 2010/0231370 A1* | 9/2010 | Lefaure | 340/438 |
| 2010/0274441 A1* | 10/2010 | Carresjo | 701/33 |

FOREIGN PATENT DOCUMENTS

| | | |
|---|---|---|
| JP | 2006 021660 A | 1/2006 |

* cited by examiner

METHOD OF POSITIONING SENSORS FOR TWINNED WHEELS OF A VEHICLE

FIELD OF APPLICATION OF THE INVENTION

This invention relates to the field of sensors housed in tires and in particular to the adaptations making it possible to differentiate them and to locate them once they are positioned in the tires of twinned wheels.

DESCRIPTION OF PRIOR ART

Sensors positioned inside tires of vehicles in order to measure and transmit information as to the pressure, temperature, etc. are known in prior art.

To do this, each sensor placed in each tire is conventionally provided with a transmitter for the purposes of wireless transmission of said data, to a receiver placed on the axle or the chassis of the vehicle. This receiver receives and decodes the informative signals emitted by the transmitters of each wheel.

In certain vehicles such as heavy trucks as well as buses, the wheels are mounted in pairs at each axle end, it is then said that the wheels are twinned. In such a framework, the operation of the network of sensors described hereinabove can have difficulties which are described hereinafter.

The twinning of the wheels renders the two sensors very close wherein it is difficult to differentiate them when stopped as well as during the operation of the vehicle without implementing particularly complex and costly coding and identification techniques.

Indeed, for example, during the learning, i.e. during the adjustment phase of the management system of the information coming from the sensors when stopped, a simultaneous activation of the two sensors can be carried out involuntarily when they are interrogated by the operator by means of his electronic interrogation module that he directs towards the outside tire.

Likewise, during an operating phase during displacement, the proximity of the sensors of the wheels of the same end of an axle makes it difficult to decode the messages due to the collision of frames and due to the fact that the electromagnetic radiation emitted by the sensors and received by the receiving module is of the same power level which inhibits the capacity to receive the message (receiver made blind).

A difficulty is added when the sensors are connected to the valve and, in order to facilitate the inflating of the twinned wheels, the valve holes are aligned.

DESCRIPTION OF THE INVENTION

Taking this state of fact, the applicant has carried out research aiming to solve the difficulties observed in the operation of a system of sensors for vehicles having twinned wheels.

This research has resulted in the designing of a method for positioning sensors on wheels installed coaxial to the same end of the same axle. This method is very inexpensive and particularly easy to implement. It does not require any modification of the existing communication technologies.

According to the invention, this method for positioning sensors on wheels installed coaxial to the same end of the same axle of a vehicle comprising a receiving module associated to the chassis of the vehicle, is remarkable in that it comprises positioning the sensors according to an angular interval greater than or equal to ninety (90) degrees of one wheel in relation to the other in such a way that during the operation during displacement, the distance between the receiving module and the sensor varies according to the wheel revolution and using a link of the low frequency (LF) type in such a way that the creation of a distance between the emission points makes it possible to vary the power level of the signals received, and as such making them distinct.

This angular interval makes it possible to separate the two sensors despite the twinning of the wheels. This separation will make it possible to activate the two sensors separately during the learning phase. Furthermore, during the operation during displacement, the distance between the receiving module and the sensor varies according to the wheel revolution. So, the signal will be received at different power levels which guarantees the reception of said signal without the aforementioned disadvantages. Indeed, the power level of the signals emitted is equal but the creation of a distance between the emission points will make it possible to vary the power level of the signals received, thus rendering them distinct.

As such, by simple angular separation, the method of the invention provides a better reading of the information coming from the sensors without modifying said sensors or the communication protocols.

According to a particularly advantageous characteristic of the invention, the method comprises positioning the respective sensors of each wheel according to an angular interval that is substantially equal to one hundred and eighty (180) degrees. By setting the interval to the maximum possible, this characteristic not only guarantees the maximum shift between the emission points of the two signals or frames but further makes it possible for the operator to easily locate the second sensor once the first is activated.

When the sensors are not associated to the valve of the wheel in the tire wherein they are installed, the method comprises positioning the sensors on valves of the wheels and positioning the wheels in such a way that their respective valve and therefore their associated sensor are positioned according to the angular interval desired.

When, as explained hereinabove, the sensors are associated to the valve of the wheel in the tire wherein they are installed, the method is particularly advantageous in that it comprises positioning the wheels in such a way that their respective valve and therefore their associated sensor, are positioned according to the angular interval desired. As such, it is no longer the sensor alone that changes angular position but the entire wheel in such a way as to position its valve in order to separate the sensor that it is holding from the one carried by the valve of its twin wheel.

The angular positioning of the valve of the wheel and therefore of a wheel in relation to its twin can be greater than or equal to ninety degrees or substantially equal to one hundred and eighty degrees in such a way as to take advantage of the technical effects described hereinabove. The association of sensors to valves here has the advantage of offering a visual reference mark at the position of the sensors when they are activated during the phase learning.

When the sensor cannot be associated to the valve, the method is particularly advantageous in that it comprises carrying out an outside visual reference mark on the rim of the outside twinned wheel on the chosen position of the sensor. As such, according to the angular interval established, the operator knows where the second sensor is located and where he must direct his electronic interrogation module.

Another solution to this problem of locating comprises positioning the sensors on valves.

Another object of the invention relates to the device making it possible to implement the method described hereinabove.

The fundamental concepts of the invention having just been exposed hereinabove in their most basic form, other details and characteristics will become clearer when reading the following description and in relation to the annexed drawings, providing by way of a non-limited example, an embodiment of a method for positioning sensors present in twinned wheels in accordance with the invention.

DESCRIPTION OF PREFERRED EMBODIMENTS

Figure 1:
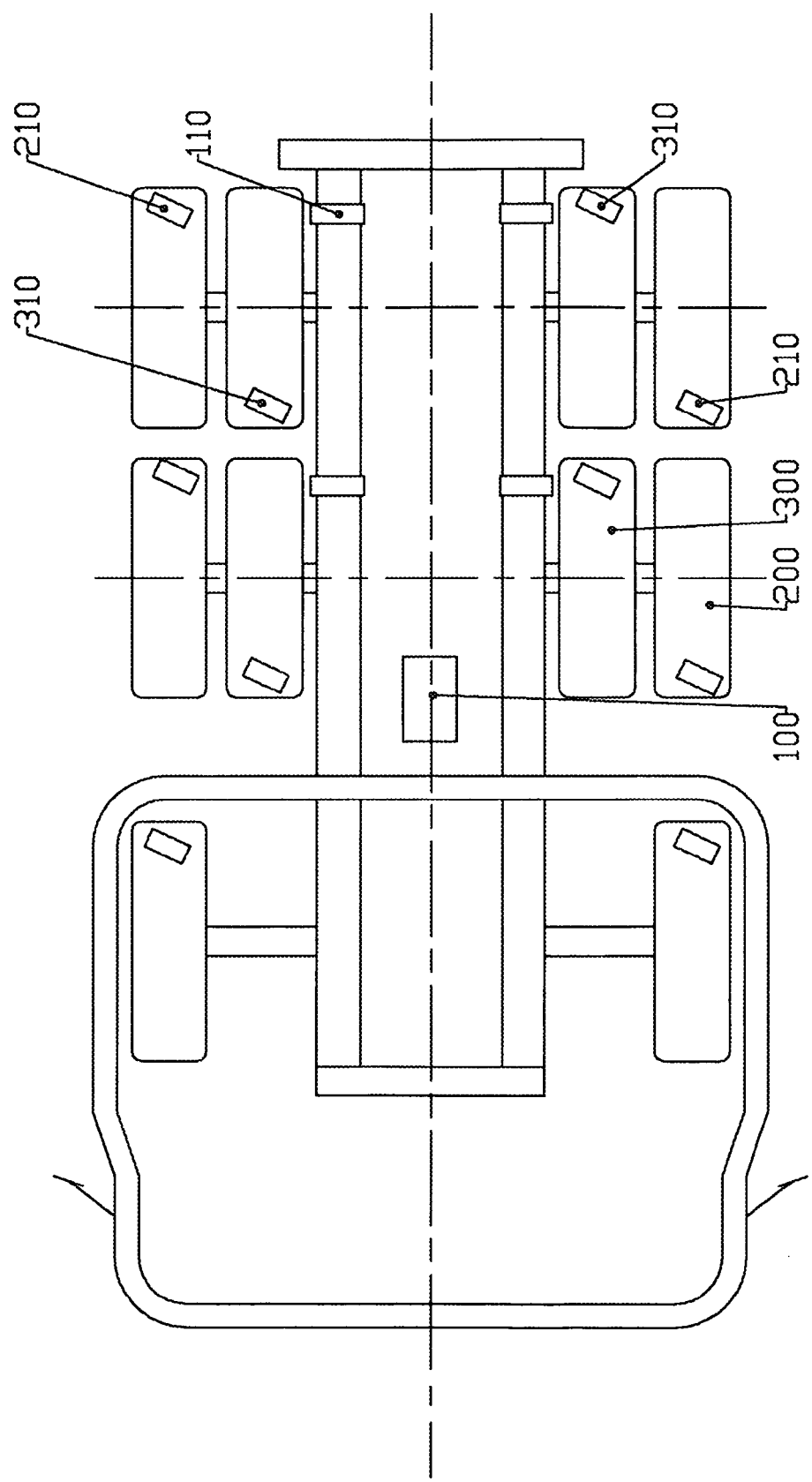
FIG. 1 is a schematic top view cross-section drawing of a tractor truck having axles provided with twinned wheels.

The drawing in FIG. 1 shows the axles of a tractor truck referenced as C of which the rear axles are provided at their ends with twinned wheels. In accordance with the invention, the wheels of said truck C are each provided with a sensor which measures the pressure and/or the temperature of the tires wherein they are housed.

According to the embodiment shown, the truck C is provided with a device that comprises a receiving module 100 associated to the chassis of the truck and receiving data coming from receiving antennas 110 associated to said chassis for each pair of twinned wheels 200 for the outside wheel and 300 for the inside wheel, each one being provided with a sensor 210 and 310 emitting the signals containing the information linked to the temperature and to the pressure of the tires wherein they are housed. This proximity between the receiving antennas 110 linked to the chassis of the vehicle V and the emitting sensors 210 and 310 rotating with the wheels makes it possible to use a low frequency (LF) link.

Figure 3:
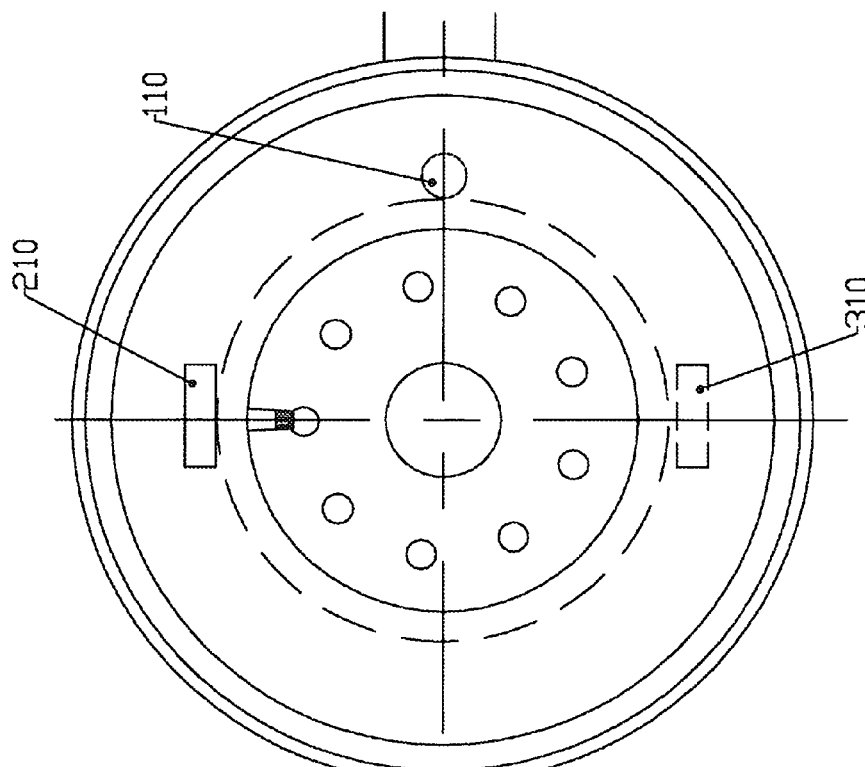
FIG. 3 is a schematic side view drawing showing another arrangement of sensors.

According to the embodiment shown in FIGS. 1 and 3, the sensors 210 (in solid lines) and 310 (in short dashed lines) are positioned according to an angular interval that is substantially equal to one hundred and eighty degrees (180) of one wheel 200 in relation to the other 300. As such, during the displacement of the vehicle, each sensor will pass in front of the antenna 110 according to a time interval that is as long as possible due to the greatest possible angular separation which avoids any signal collision and consequently any incorrect taking into account by the antenna and by the receiving module 100 to which it is associated. According to a preferred embodiment, the signal is comprised by the emission of three frames.

Figure 2:
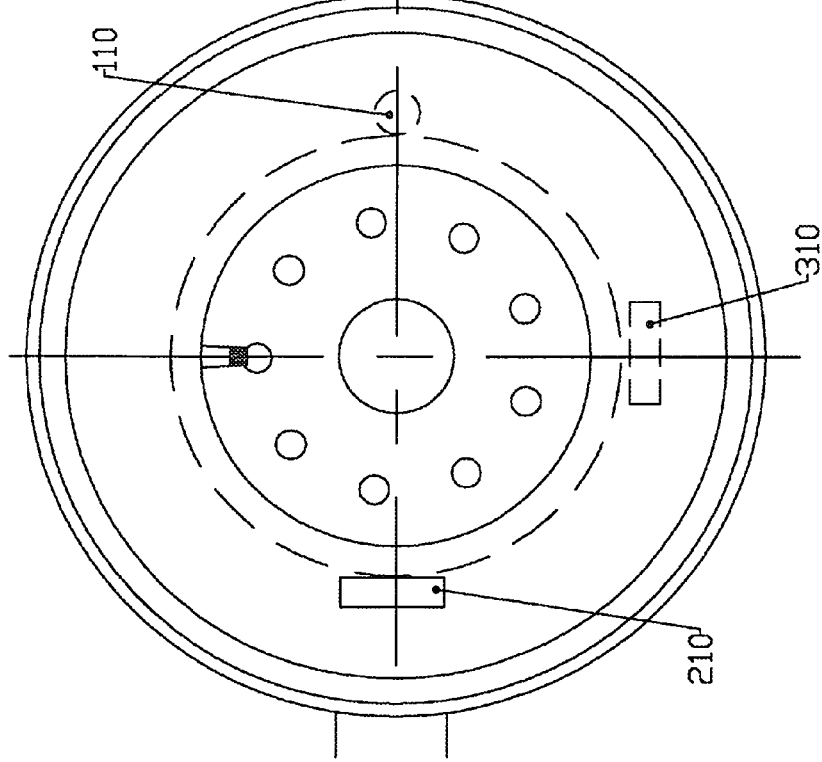
FIG. 2 is a schematic side view drawing showing a first arrangement of sensors.

The embodiment shown in FIG. 2 shows a positioning of the sensors 210 and 310 which are not associated to the valve of the wheel in the tire wherein they are installed, according to an angular interval greater than or equal to ninety (90) degrees of one wheel in relation to the other.

The embodiment shown in the drawing in FIG. 3 shows sensors 210 and 310 either associated to the valve of the wheel in the tire wherein they are installed, or positioned on valves (only the valve 220 of the outside wheel 200 appears).

It is understood that the method and the device, which have been described and shown hereinabove, have been described and shown for the purposes of a divulgation rather than a limitation.

Of course, various arrangements, modifications and improvements can be made to the example hereinabove, without however leaving the scope of the invention.

The invention claimed is:

1. A method for positioning sensors on a vehicle comprising a chassis, an axle, and a receiving module coupled to the chassis, the method comprising:
   positioning a first wheel on the axle, on a first side of a plane of symmetry of the vehicle;
   subsequently, positioning a second wheel on the axle, on the first side of a plane of symmetry;
   positioning a third wheel on the axle, on a second side of a plane of symmetry, the second side being opposite the first side;
   positioning a fourth wheel on the axle, on the second side of a plane of symmetry;
   placing a first sensor on the first wheel, the first sensor being configured to detect a pressure in the first wheel and transmit a first wireless signal indicating a detected pressure in the first wheel, the first wireless signal being of a low frequency type;
   positioning a second sensor, the second sensor being configured to detect a pressure in the second wheel and transmit a second wireless signal indicating a detected pressure in the second wheel, the second wireless signal being of the low frequency type, the second sensor being positioned such that an angular displacement, about the axle, of the second sensor relative to an angular displacement, about the axle, of the first sensor is greater than or equal to ninety degrees, such that, during movement of the vehicle, at a first time, a distance between the first sensor and the receiving module is less than a distance between the second sensor and the receiving module and, at a subsequent time, the distance between the second sensor and the receiving module is less than the distance between the first sensor and the receiving module, as a result of wheel revolution, thereby varying respective power levels of the first and second signals received by the receiving module, thereby making the first and second signals distinct from each other.

2. A method according to claim 1, wherein positioning the second sensor includes positioning such that an angular displacement, about the axle, of the second sensor relative to an angular displacement, about the axle, of the first sensor is substantially equal to one hundred and eighty degrees.

3. A method according to claim 1, further including making an outside visual reference mark, on a rim of the second wheel, at a position of the second sensor.

4. A method according to claim 1 wherein the first sensor is not associated with a valve of the first wheel and the second sensor is not associated with a valve of the second wheel, wherein the step of positioning the second sensor includes positioning the second wheel.

5. A method according to claim 1 wherein the first sensor is associated with a valve of the first wheel and the second sensor is associated with a valve of the second wheel, wherein the step of positioning the second sensor includes positioning the second wheel.

6. A receiving module configured to operate on a vehicle, the vehicle comprising:
   a chassis;
   an axle;
   a first wheel on the axle, positioned on a first side of a plane of symmetry of the vehicle;
   a second wheel on the axle, positioned on the first side of a plane of symmetry;
   a third wheel on the axle, positioned on a second side of a plane of symmetry, the second side being opposite the first side;

a fourth wheel on the axle, positioned on the second side of a plane of symmetry;

a first sensor on the first wheel, the first sensor being configured to detect a pressure in the first wheel and transmit a first wireless signal indicating a detected pressure in the first wheel, the first wireless signal being of a low frequency type;

a second sensor, the second sensor being configured to detect a pressure in the second wheel and transmit a second wireless signal indicating a detected pressure in the second wheel, the second wireless signal being of the low frequency type, the second sensor being positioned such that an angular displacement, about the axle, of the second sensor relative to an angular displacement, about the axle, of the first sensor is greater than or equal to ninety degrees, the receiving module being positioned on the chassis such that, during movement of the vehicle, at a first time, a distance between the first sensor and the receiving module is less than a distance between the second sensor and the receiving module and, at a subsequent time, the distance between the second sensor and the receiving module is less than the distance between the first sensor and the receiving module, as a result of wheel revolution, thereby varying respective power levels of the first and second signals received by the receiving module, the receiving module being configured to distinguish the first and second signals from each other.

7. A method according to claim 1 wherein the step of positioning the second sensor includes positioning the second wheel.

* * * * *